United States Patent
Baird

(10) Patent No.: US 7,277,904 B2
(45) Date of Patent: Oct. 2, 2007

(54) METHOD AND SYSTEM FOR MANAGING INTELLECTUAL PROPERTY ASPECTS OF SOFTWARE CODE

(75) Inventor: Richard J. Baird, Lower Swanick (GB)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 10/739,378

(22) Filed: Dec. 18, 2003

(65) Prior Publication Data

US 2005/0137884 A1 Jun. 23, 2005

(51) Int. Cl.
G06F 17/30 (2006.01)

(52) U.S. Cl. ...................................................... 707/204

(58) Field of Classification Search ................... 707/1, 707/2, 9, 10, 104.1, 200, 204; 705/1; 709/224
See application file for complete search history.

(56) References Cited

U.S. PATENT DOCUMENTS

| | | | | |
|---|---|---|---|---|
| 5,796,941 | A | 8/1998 | Lita | 395/187.01 |
| 6,059,838 | A | 5/2000 | Fraley et al. | 717/1 |
| 6,128,730 | A | 10/2000 | Levine | 713/1 |
| 6,385,728 | B1 | 5/2002 | DeBry | 713/201 |
| 6,499,035 | B1 | 12/2002 | Sobeski | 707/103 |
| 2001/0013024 | A1* | 8/2001 | Takahashi et al. | 705/59 |
| 2001/0049666 | A1 | 12/2001 | Prakken et al. | 705/59 |
| 2002/0073336 | A1 | 6/2002 | Toy et al. | 713/201 |
| 2002/0161717 | A1 | 10/2002 | Kassan et al. | 705/59 |
| 2002/0169625 | A1* | 11/2002 | Yang et al. | 705/1 |
| 2002/0188608 | A1* | 12/2002 | Nelson et al. | 707/10 |
| 2002/0198873 | A1 | 12/2002 | Chu-Carroll | 707/3 |
| 2003/0037006 | A1 | 2/2003 | Maruyama et al. | 705/59 |
| 2003/0061136 | A1 | 3/2003 | Inoue | 705/35 |
| 2003/0125975 | A1 | 7/2003 | Danz et al. | 705/1 |

* cited by examiner

*Primary Examiner*—Etienne Leroux
(74) *Attorney, Agent, or Firm*—Synnestvedt & Lechner LLP; Martin McKinley

(57) ABSTRACT

A method, system and computer program product for managing intellectual property (IP) aspects of software code artifacts. IP provisions are separated from, but associated with, the artifact(s) to which they apply. A software configuration management (SCM) repository/system provides an SCM repository for storing artifacts. IP provisions may also be stored in the repository. The system receives a user's command to store an artifact in the repository, receives a user's selection of an IP provision applicable to the artifact, and stores the artifact in the repository in association with the selected IP provision. Applicable IP provisions are therefore identified by a user/programmer near the time of creation of the artifact. The applicable IP information is later matched with the artifact at the time of retrieval of the artifact from the system. In this manner, IP aspects of artifacts are tracked by the SCM system and current IP information is ensured.

22 Claims, 4 Drawing Sheets

Artifact stored in SCM repository

Output of Artifact stored in SCM repository

METHOD AND SYSTEM FOR MANAGING INTELLECTUAL PROPERTY ASPECTS OF SOFTWARE CODE

FIELD OF THE INVENTION

The present invention relates generally to software configuration management, and more particularly to a method and computer system for managing intellectual property aspects of software code/artifacts stored in a software configuration management repository.

BACKGROUND OF THE INVENTION

The field of software configuration management (SCM) generally relates to oversight of the development of a software product or products. SCM more specifically relates to identification of the software components to be controlled, structure of the overall product, control over changes to the components, accurate and complete record keeping relating to such components, and a mechanism to audit or verify any actions with respect to such components. Accordingly, SCM relates to the evolution of and access to software components, which is typically performed by teams of developers in geographically diverse locations. Additionally, there are typically many revisions to such software components over time, and multiple software components may be integrated into one or more discrete software products. Accordingly, performance of the requisite SCM functions is usually complex.

Various software suppliers presently offer SCM software that performs certain SCM functions. Generally, such SCM software facilitates communication between software developers and enhances workflow by tracking changes to artifacts stored via the SCM software in an SCM repository (i.e., database). Such artifacts include a broad range of software/digital assets, including computer files in a variety of formats, such as programming language (COBOL, C, Java, etc.), source code, HTML files, XML files, ASCII text files, executable (*.exe) files, etc. For example, such software may identify source code files by name, corresponding versions and changes, associated programs that use such source code, programmers having developed such source code, how to compile the source code to an executable format, etc.

Applicant has recognized that management of the intellectual property aspects of artifacts in an SCM repository is overly burdensome or non-existent, particularly when the artifacts are written, used or modified by numerous parties, and originate from various entities (e.g., pre-existing open source code, proprietary internally developed code, and proprietary externally developed code). Such intellectual property aspects include providing notice of a license agreement applicable to an artifact, identifying the terms of conditions of such a license agreement, a notice of any applicable intellectual property protection, such as copyright or patent protection, and/or other proprietary/informational notices. Applicant has further recognized that SCM software of the prior art is inadequate with respect to management of the intellectual property aspects of such artifacts. Still further, Applicant has recognized that prior art SCM software is incapable of tracking and providing notice of such intellectual property aspects as they relate to software products incorporating one or more of such artifacts. To date, programmers have been responsible for manually tracking intellectual property aspects of such artifacts, for providing appropriate notices by manually hard coding such notices into the artifact, manually noting whether there are any applicable intellectual property considerations, etc. This approach is prone to human error in performance and lack of performance, lacks uniformity, and makes it extremely difficult to update artifacts to reflect a revision to a particular license agreement, etc. because it necessitates a change in every artifact to which the license agreement applies. Furthermore, it renders it extremely burdensome to ensure compliance with applicable license provisions, copyright notices, etc. when releasing a new software product, because license provisions/notices hard coded into any artifacts incorporated into the software product are likely out of date, inaccurate, or missing altogether. This often necessitates a manually intensive audit of the software product to identify any artifacts incorporated therein, any applicable licenses and notices, and any updated/current versions of such licenses and notices.

SUMMARY OF THE INVENTION

The present invention provides a system, method and computer program product for managing intellectual property (IP) aspects of artifacts via a software configuration management (SCM) repository/system. Conceptually, the present invention stores the IP information in a database, but separates the IP information from the artifact(s) to which it applies. An association between the artifact and applicable IP information is established.

In a certain embodiment, an SCM system in accordance with the present invention provides an SCM repository for storing artifacts, receives a user's command to store an artifact in the SCM repository, receives a user's selection of an IP provision applicable to the artifact, and stores the artifact in the SCM repository in association with the selected IP provision. In this manner, an applicable IP provision is identified by a user/programmer near the time of creation of the artifact. The applicable IP information is later matched with the artifact at the time of retrieval of the artifact from an SCM system. In this manner, a current version of the IP information is ensured, without the need to manually modify any artifacts to which a revised IP provision applies.

A system and a computer program product are also provided.

BRIEF DESCRIPTION OF THE DRAWINGS

The present invention will now be described by way of example with reference to the following drawings in which.

DETAILED DESCRIPTION

Figure 1:
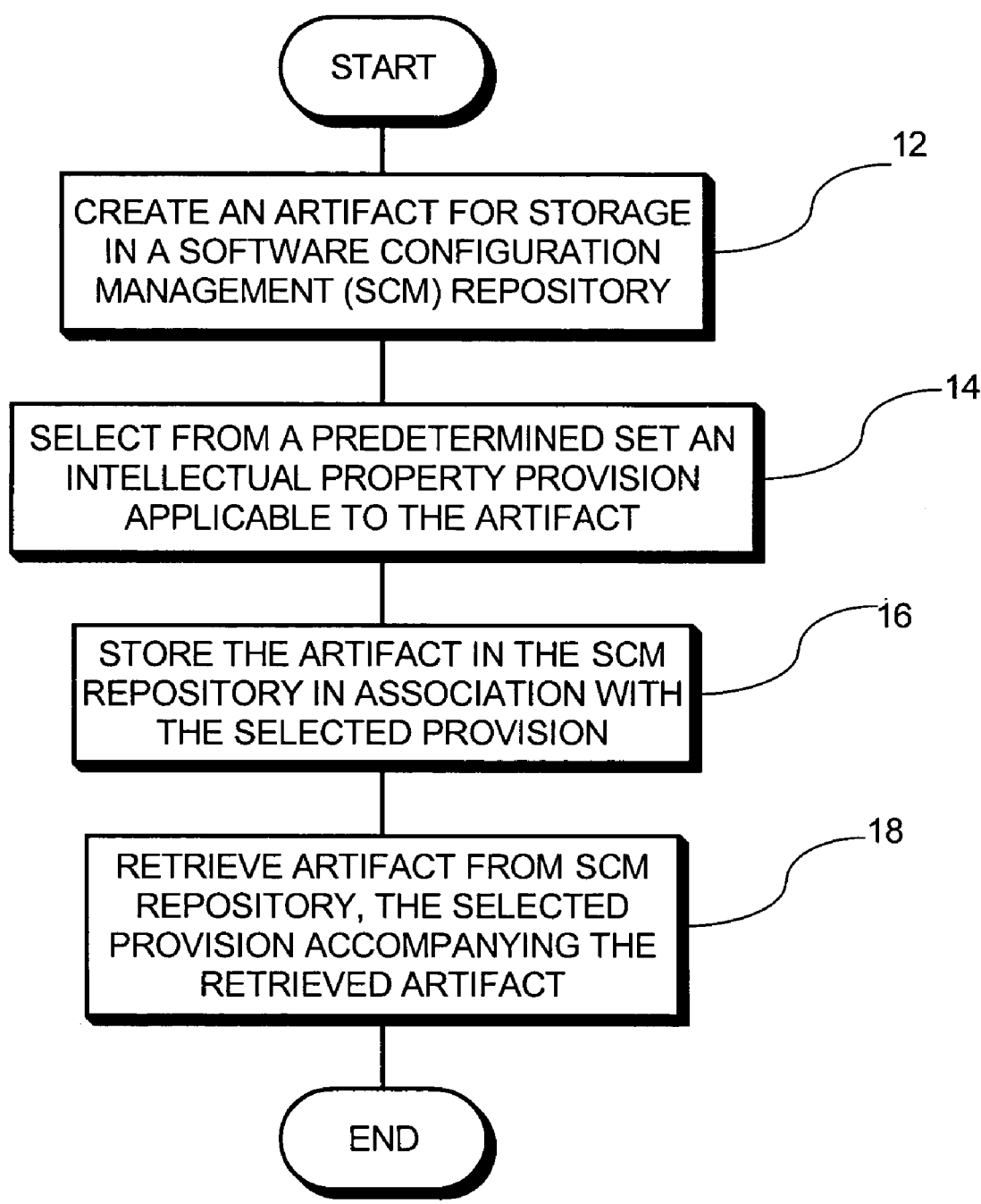
FIG. 1 is a flow diagram showing an overview of an exemplary method in accordance with the present invention, shown from a user's perspective.

FIG. 1 is a flow diagram 10 showing from a user's perspective an exemplary method for managing intellectual property aspects of artifacts via an SMC repository of a software implemented SCM system in accordance with the present invention. The method begins with creation of an artifact for storage in the SCM repository, as shown at step 10 in FIG. 1. This step may be performed in a conventional manner by a software programmer using conventional software development tools, as will be appreciated by those skilled in the art.

The user (e.g. programmer) then selects, from a predetermined set, an intellectual property provision applicable to the artifact, as shown at step 14. This step may be performed via a graphical user interface, e.g. by selecting an appropriate option from a menu or providing typed input, etc., of the SCM system that has been specially configured in accordance with the present invention. The SCM system may be generally similar to SCM software/systems known in the art, except that it has been modified to provide functionality in accordance with the present invention. More particularly, the SCM system may include an SCM repository that stores not only artifacts, as is conventional, but also stores IP provisions and/or associations with IP provisions. For example, such IP provisions may include a conventional GPL (general public license), an LGPL (a Lesser General Public License), an internal license developed by the programmer's employer for software the programmer develops, an external license applicable to software developed by a third party, etc. These provisions may include the actual textual provisions that are the terms and conditions of the license agreements. Such IP provisions may further include copyright or patent notices, or other proprietary/informational notices required by the programmer's employer or others. Optionally, the user can select an IP provision by selecting a corresponding identifier (e.g. GPL, LGPL, IBM, none from a predetermined set). Preferably, the IP provisions/their corresponding identifiers are selectable by selecting an option from a menu displayed via a video display screen, e.g. via a graphical user interface.

Figure 3A:
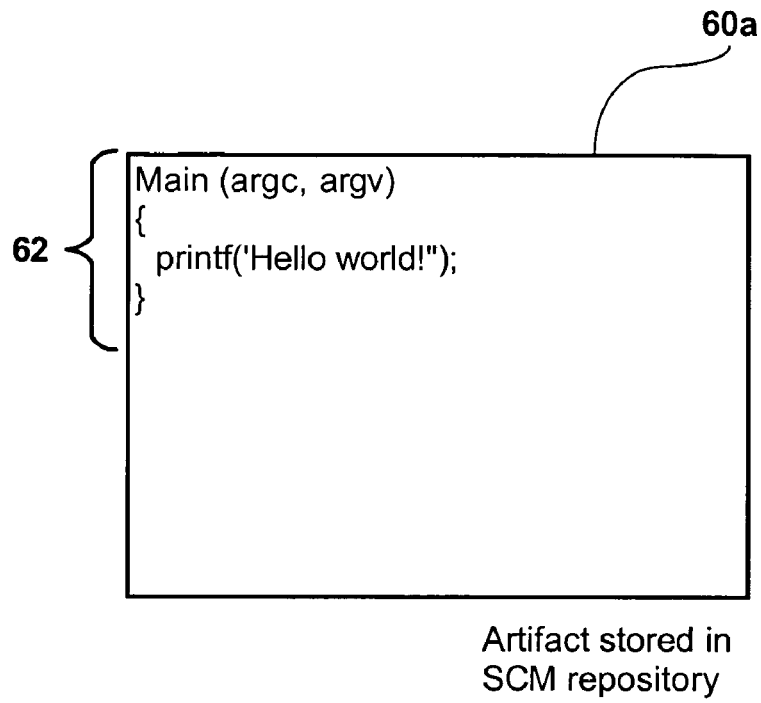
FIG. 3A shows an exemplary artifact for input to a system in accordance with the present invention.

The artifact is then stored in the SCM repository, as shown at step 16. This may be performed in a manner similar to that well known in the art, except that the storage in accordance with the present invention causes an association to be made (stored) between the stored artifact and the IP provision identified by the user. By way of example, such an association may be made by identifying the user-selected IP provision in an attribute stored in association with the file. For example a GPL attribute may be tied to an artifact to indicate that the GPL license is applicable to that artifact. Use of attributes for various other purposes is generally known in the art, particularly in connection with an SCM system and artifacts stored therein, e.g. identifying which parameters are to be used when the source code is compiled into an executable format. Accordingly, the artifact is stored in the SCM repository in association with the selected IP provision. An exemplary C-language source code file 60a is shown in FIG. 3A. The file 60a includes C-language code 62 that is the artifact stored in the SCM repository. The association with an IP provision is not shown in the illustration of FIG. 3A.

Figure 3B:
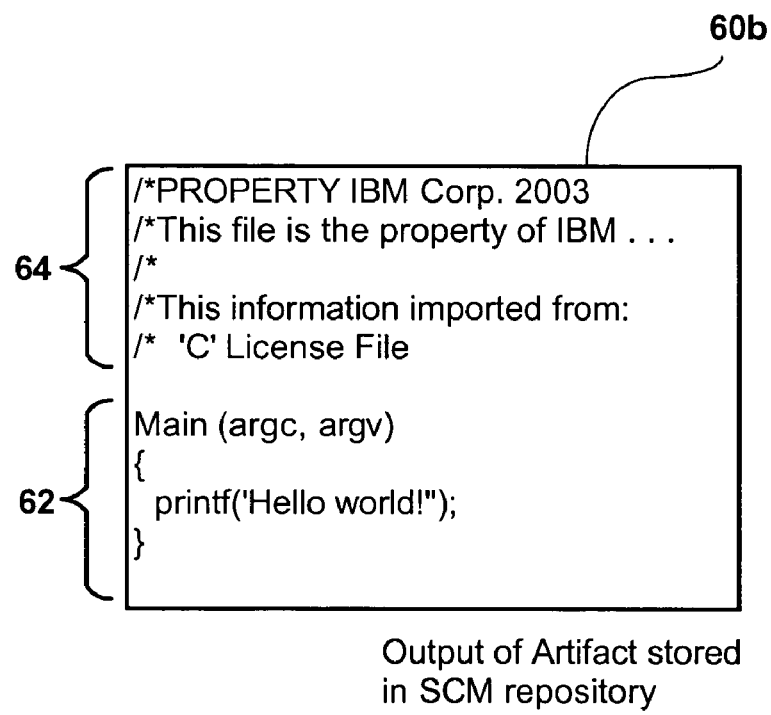
FIG. 3B shows exemplary formatted and printed output from the system corresponding to the artifact shown in FIG. 3A.

The IP provision may identify a license agreement, as discussed above, and the license agreement is preferably stored in the SCM repository as an artifact itself. The license agreement identifies terms and conditions for use of the associated artifact. Preferably, the license agreement is stored in a format such that it can be automatedly incorporated into the artifact, automatically bound (e.g. during compiling) with an executable file of a software product incorporating the artifact, or printed, exported or otherwise be output from the SCM system at the time of retrieval of the artifact from the SCM system. Accordingly, the user or another (collectively, "user"), may later retrieve the artifact from the SCM repository, as shown at step 18, and will receive both the artifact and the previously identified IP provision associated with the retrieved artifact. For example, the artifact and/or the IP provision may be electronically exported/saved elsewhere within a computer system, may be printed via a conventional laser printer or the like, etc. In this manner, in response to a request for retrieval of the artifact, output from the SCM repository is provided that identifies both the artifact and the associated IP provision. An exemplary formatted and printed C-language output file 60b is shown in FIG. 3B. The output file 60b includes the C-language code 62 that is the artifact stored in the SCM repository (see FIG. 3A). In addition, the exemplary output file includes the text of an associated IP provision that includes a statement of proprietary rights. This particular IP provision was initially identified by the programmer, and is provided as part of the output in response to a request for the associated artifact in accordance with the present invention. In this particular example, the artifact is modified to incorporate the applicable IP provision as comments at an initial portion of the artifact, and the modified artifact is provided as output of the SCM system.

Figure 2:
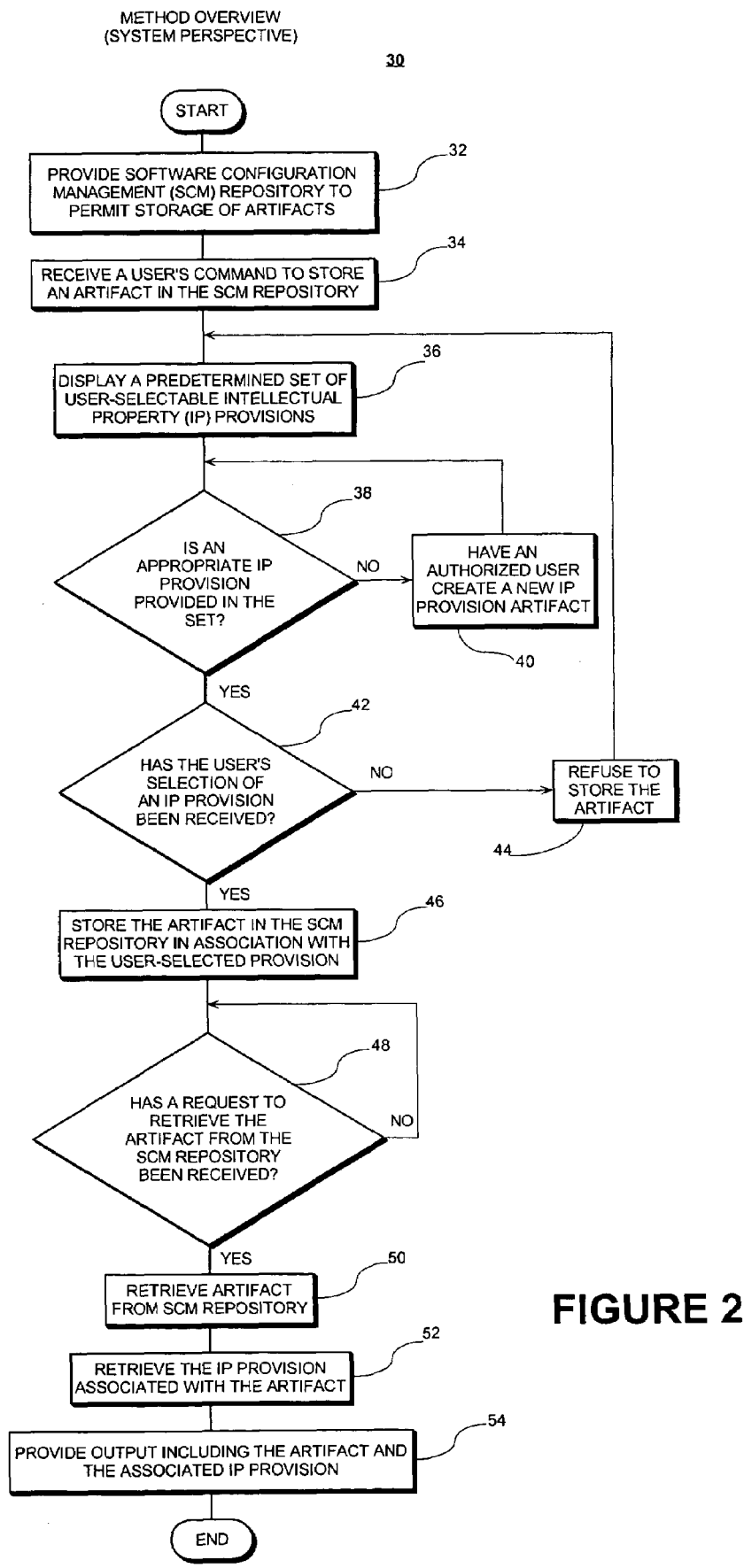
FIG. 2 is a flow diagram showing an exemplary method in accordance with the present invention, shown from a system's perspective.

FIG. 2 is a flow diagram 30 showing from a system's perspective an exemplary method for managing IP aspects of artifacts stored an SCM repository of an SCM system in accordance with the present invention. As shown in FIG. 2, the method begins with providing of an SCM repository to permit storage of artifacts, as shown at step 32. As discussed above, this can be achieved by configuring a general purpose computer with SCM software similar to that known in the art, except that such software is specially configured in accordance with the present invention. The SCM system then receives a user's command to store an artifact in the SCM repository, as shown at step 34. Such an artifact may include code developed by the user. The command may be received via a GUI or other interface of the SCM system.

In connection with storing of the artifact in the SCM repository, e.g. in response receipt of the user's command, the system prompts the user to select an IP provision applicable to the artifact. For example, this may be performed by displaying a predetermined set of user-selectable options corresponding to the IP provisions as shown at step 36, e.g. in a menu format. Each user-selectable option corresponds to an existing IP provision, such as an IP provision stored in the SCM system.

It is next determined whether an appropriate IP provision is provided in the displayed set, e.g. as a function of user input, as shown at step 38. If an appropriate IP provision is not available, then the user is prompted to request that a new one be created by the system administrator or other authorized user, as shown at step 40. This helps to ensure tight control over license usage within newly developed code.

If an appropriate IP provision is provided, then it is determined whether the system has received the user's selection of an IP provision, as shown at step 42. If so, the system stores the artifact in the SCM repository in association with the user-selected provision, as shown at steps 42 and 46. For example, this may be performed by storing information as an attribute of the artifact, the attribute indicating which IP provision(s) is/are associated with the artifact, as discussed above. Alternatively, the artifact may be stored before selection of IP provision, and later deleted if no IP provision is selected, etc. Any suitable method may be used, as will be appreciated by those skilled in the art.

In the exemplary embodiment illustrated in FIG. 2, the system refuses to store the artifact if the system has not received the user's selection of an applicable IP provision, and again prompts the user to select an IP provision, as shown at steps 42 and 44. In this manner, the storing is performed only if the user has selected the IP provision applicable to the artifact, and the system thereby ensures that artifacts are stored in association with applicable IP provisions. This helps to ensure compliance with company policies requiring inclusion of proprietary/informational notices in such artifacts, etc. This also facilitates identification of applicable notices, license agreements, license terms, etc. that may be applicable to any later developed software product that incorporates the artifact. This helps to ensure that proper notices are provided, that proper use is made of the artifact/program, that compliance with applicable license provisions is had, etc. Additionally, this may allow for automated incorporation of applicable notices and/or license terms into such a software product. For example, if a software product incorporates an artifact including code that is subject to a GPL license, the GPL license will state how the codes of the software product can be made available in the open source market. The present invention facilitates identification of which license is applicable to the software product and facilitates compliance with that license by providing notice of the license's applicability. The present invention facilitates identification of the GPL license as applicable to the software product and facilitates compliance with the GPL license by providing notice of the GPL license's applicability.

When the SCM system receives a request for retrieval of the artifact from the SCM repository, it retrieves the requested artifact, as shown at steps 48 and 50. This request may be made by the original programmer/user, or another. In response to that request for the artifact, the system also automatically retrieves the IP provision associated with the artifact, as shown at step 52. The IP provision is preferably stored in a database accessible to the system, such as the SCM repository itself. In this manner, the IP provisions may be treated as another artifact managed by the system. This may involve the SCM system reading/identifying the attribute indicating the IP provision applicable to the requested artifact. The system then provides output that includes both the artifact and the associated IP provision, as shown at step 54.

Such output may have various forms. For example, providing such output may involve printing the artifact, e.g. via a laser printer, and printing the associated IP provision. Optionally, the artifact and IP provision may be printed as separate documents. Alternatively, the system may modify the artifact to include the associated IP provision before printing the artifact so that the artifact and applicable IP provision are provided as a single document, as shown in FIG. 3B. By way of further example, providing the output may involve exporting the artifact, e.g. by creating a data file is communicated and/or stored outside of the SCM repository, and exporting the associated IP provision. Optionally, the exporting may involve modifying the artifact to include the associated IP provision, as discussed above.

As a result of the storage of artifacts in the SCM repository in association with applicable IP provisions, it is possible to identify artifacts to which a certain IP provision is applicable and/or to identify an applicable IP provision for a certain artifact. In accordance with the present invention, SCM software is further modified to enable reporting of such information. For example, such software is configured to provide a report that identifies a plurality of artifacts stored in the SCM repository, and the respective associated IP provision(s) for each of the artifacts. Further, the system is configured such that a report may be generated for a particular software product that incorporates certain artifacts stored in the SCM repository, such that the artifacts identified in the report are only those artifacts that are incorporated into the particular software product, and such that applicable license provisions are identified for each artifact. This can be very useful in developing license agreements for the software product, IP or other proprietary notices for the software product, etc.

The present invention provides a system, method and computer program product for managing intellectual property (IP) aspects of artifacts via a software configuration management (SCM) repository/system. In contrast to the traditional approaches of (1) hard coding IP information directly into the artifact (computer file) or (2) having an artifact that is completely devoid of IP information, the present invention conceptually separates the IP information from the artifact(s) to which it applies, but establishes a persistent association between the artifact and applicable IP information, both of which are preferably stored electronically, e.g. in an SCM repository. An applicable IP provision is preferably identified by a user/programmer near the time of creation of the artifact. Exemplary IP provisions may identify a license agreement that applies to the artifact, the actual terms and conditions of the applicable license agreement, or a textual notice of intellectual property rights (e.g. copyright notice, patent notice or a statement of proprietary rights). The applicable IP information is matched with the artifact at the time of retrieval of the artifact from an SCM system. In this manner, a current version of the IP information is ensured. For example, if the corresponding license agreement has been updated since the creation of the artifact, the updated license agreement is matched with the artifact at the time of the artifact's retrieval from an SCM repository. Additionally, changes in IP provision after creation of artifacts to which the IP provision applies, then the single IP provision can be modified (e.g. the IP provisional centrally stored in the SCM) and it will be applied to all related artifacts upon their retrieval, without the need to individually and/or manually modify those artifacts.

The reporting and other steps described above can be implemented using standard well-known code techniques. The novelty of the above-described embodiment lies not in the specific programming techniques but in the use of the steps described to achieve the described results. Software programming code that embodies the present invention is typically stored in permanent storage of some type, such as permanent storage of a workstation. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified herein. Accordingly, the Figures support combinations of means for performing the specified functions, combinations of steps for performing the specified functions, and program instruction means for performing the specified functions.

Figure 4:
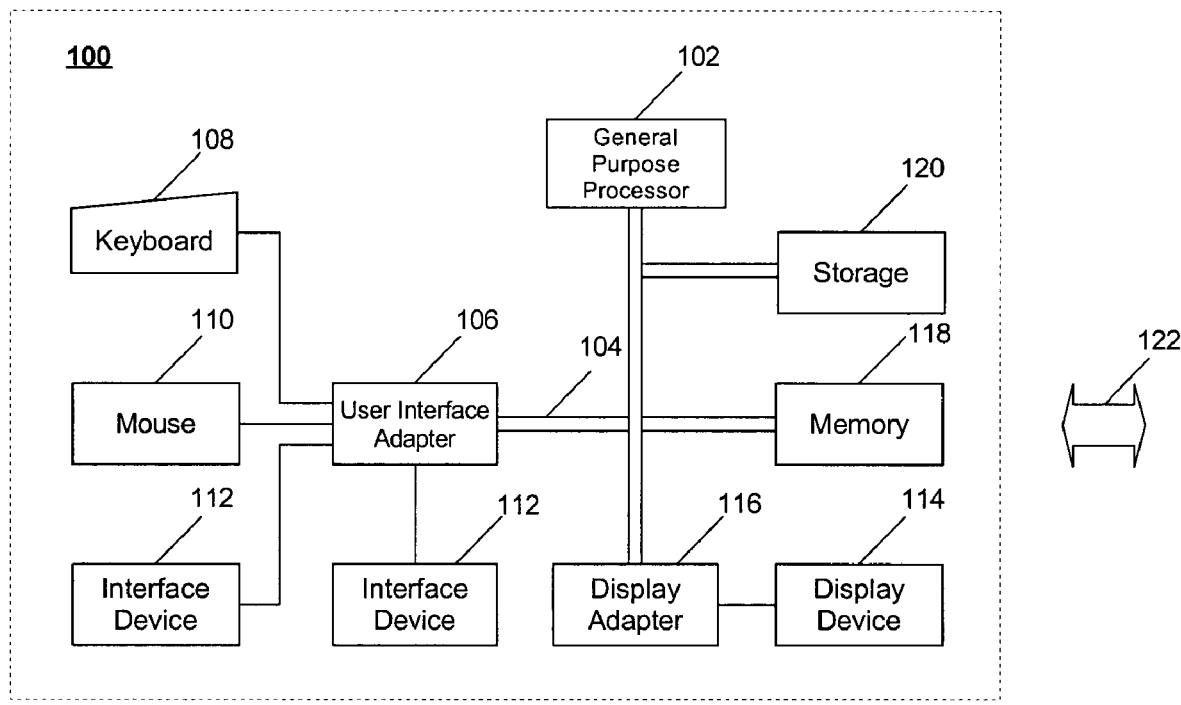
FIG. 4 is a block diagram showing an exemplary software configuration management system in accordance with the present invention.

FIG. 4 is a block diagram of an exemplary software configuration management system in accordance with the present invention. As is well known in the art, the software configuration management system of FIG. 4 includes a general purpose microprocessor (CPU) 102 and a bus 104 employed to connect and enable communication between the microprocessor 102 and the components of the information processing system 100 in accordance with known techniques. The information processing system 100 typically includes a user interface adapter 106, which connects the microprocessor 102 via the bus 104 to one or more interface devices, such as a keyboard 108, mouse 110, and/or other interface devices 112, which can be any user interface device, such as a touch sensitive screen, digitized entry pad, etc. The bus 104 also connects a display device 114, such as an LCD screen or monitor, to the microprocessor 102 via a display adapter 116. The bus 104 also connects the microprocessor 102 to memory 118 and long-term storage 120 (collectively, "memory") which can include a hard drive, diskette drive, tape drive, etc.

The software configuration management system 100 may communicate with other computers or networks of computers, for example via a communications channel, network card or modem 122. The information processing system 100 may be associated with such other computers in a local area network (LAN) or a wide area network (WAN), or the information processing system 100 can be a client or server in a client/server arrangement with another computer, etc. All of these configurations, as well as the appropriate communications hardware and software, are known in the art.

Software programming code for carrying out the inventive method is typically stored in memory. Accordingly, software configuration management system 100 stores in its memory microprocessor executable instructions. These instructions may include a first program for providing a software configuration management system for storing artifacts in a software configuration management repository; a second program for receiving a user's command to store an artifact in the software configuration management repository; a third program for receiving a user's selection of an intellectual property provision applicable to the artifact; and a fourth program for storing the artifact in the software configuration management repository in association with the selected intellectual property provision. Optionally, the system may further include a fifth program for providing output from the software configuration management system in response to a request for retrieval of the artifact from the software configuration management repository, the output including the artifact and the associated intellectual property provision, and/or other programs for carrying out other aspects of the method described above.

A computer program product recorded on a computer readable medium for managing intellectual property aspects of artifacts via a software configuration management system is also provided. The computer program product includes computer readable code for: providing a software configuration management system for storing artifacts in a software configuration management repository; receiving a user's command to store an artifact in the software configuration management repository; receiving a user's selection of an intellectual property provision applicable to the artifact; and storing the artifact in the software configuration management repository in association with the selected intellectual property provision. The computer program product may further include computer readable code for providing output from the software configuration management system in response to a request for retrieval of the artifact from the software configuration management repository, the output including the artifact and the associated intellectual property provision and/or carrying out any of the other method steps described above.

Additionally, computer readable media storing computer readable code may be provided for carrying out each step of the method as described above.

It will be appreciated that a graphical user interface may be advantageously provided to implement the present invention.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for managing intellectual property aspects of artifacts via a software configuration management repository of a software configuration management system, the method comprising operating the software configuration management system to:
   create an artifact for storage in the software configuration management repository, the artifact comprising software code configured for subsequent incorporation into a software product;
   display a menu of options via a video display device of the software configuration management system, each of the options corresponding to a respective one of a predetermined set of predefined intellectual property provisions, the set including at least one of a license agreement and a proprietary notice;
   select, from the predetermined set of predefined intellectual property provisions, an intellectual property provision that shall apply to the artifact and to any software products incorporating the artifact; and
   store the artifact in the software configuration management repository of the software configuration management system, the artifact being stored in the software configuration management repository in association with the selected intellectual property provision.

2. The method of claim 1, wherein the intellectual property provision identifies an intellectual property license agreement.

3. The method of claim 2, wherein the intellectual property license agreement is stored in the software configuration management repository, the intellectual property license agreement identifying terms and conditions for use of the associated artifact.

4. The method of claim 1, further comprising operating the software configuration management system to request retrieval of the artifact from the software configuration management repository, the retrieval request causing creation of output from the software configuration management repository, the output identifying both the artifact and the associated intellectual property provision.

5. A method for managing intellectual property aspects of artifacts via a software configuration management system, the method comprising:
  providing a software configuration management system for storing artifacts in a software configuration management repository;
  receiving a user's command to store an artifact in the software configuration management repository, the artifact comprising software code configured for subsequent incorporation into a software product;
  receiving a user's selection of an intellectual property provision that is applicable to the artifact and that will apply prospectively to any subsequently created software that may incorporate the artifact; and
  storing the artifact in the software configuration management repository in association with the selected intellectual property provision, the intellectual property provision being applicable to the software product.

6. The method of claim 5, further comprising:
  in response to a request for retrieval of the artifact from the software configuration management repository, providing output from the software configuration management system, the output including the artifact and the associated intellectual property provision.

7. The method of claim 6, wherein providing the output comprises:
  printing the artifact; and
  printing the associated intellectual property provision.

8. The method of claim 7, further comprising modifying the artifact to include the associated intellectual property provision.

9. The method of claim 6, wherein providing the output comprises:
  exporting the artifact; and
  exporting the associated intellectual property provision.

10. The method of claim 9, further comprising modifying the artifact to include the associated intellectual property provision.

11. The method of claim 6, wherein providing the output comprises:
  retrieving the artifact from the software configuration management repository; and
  retrieving the intellectual property provision from a database.

12. The method of claim 11, wherein the database comprises the software configuration management repository.

13. The method of claim 5, further comprising:
  displaying to the user a menu including a user-selectable option for each of the intellectual property provisions.

14. The method of claim 5, further comprising:
  prompting the user to select an intellectual property provision applicable to the artifact, wherein the storing is performed only if the user has selected the intellectual property provision applicable to the artifact.

15. The method of claim 5, further comprising:
  providing a report identifying a plurality of artifacts stored in the software configuration management repository, the report further identifying a respective associated intellectual property provision for each of the plurality of artifacts.

16. The method of claim 15, wherein the report is generated for a particular software product, and wherein the plurality of artifacts includes only those artifacts incorporated into the particular software product.

17. A system for managing intellectual property aspects of artifacts via a software configuration management system, the system comprising:
  a central processing unit (CPU) for executing programs;
  a memory operatively connected to said CPU;
  a first program stored in said memory and executable by said CPU for providing a software configuration management system for storing artifacts in a software configuration management repository;
  a second program stored in said memory and executable by said CPU for receiving a user's command to store an artifact in the software configuration management repository;
  a third program stored in said memory and executable by said CPU for receiving a user's selection of an intellectual property provision applicable to the artifact, the user's selection being selected from a set of predefined intellectual property provisions including at least one of a license agreement and a proprietary notice; and
  a fourth program stored in said memory and executable by said CPU for storing the artifact in the software configuration management repository in association with the selected intellectual property provision.

18. The system of claim 17, further comprising a fifth program for providing output from the software configuration management system in response to a request for retrieval of the artifact from the software configuration management repository, the output including the artifact and the associated intellectual property provision.

19. The system of claim 17, further comprising a fifth program for providing a report identifying a plurality of artifacts stored in the software configuration management repository, the report further identifying a respective associated intellectual property provision for each of the plurality of artifacts.

20. The system of claim 19, wherein the report is generated for a particular software product, and wherein the plurality of artifacts includes only those artifacts incorporated into the particular software product.

21. A computer program product recorded on a computer readable medium for managing intellectual property aspects of artifacts via a software configuration management system, said computer program product comprising:
  computer readable code for providing a software configuration management system for storing artifacts in a software configuration management repository;
  computer readable code for receiving a user's command to store an artifact in the software configuration management repository;
  computer readable code for receiving a user's selection of an intellectual property provision applicable to the artifact; and
  computer readable code for storing the artifact in the software configuration management repository in association with the selected intellectual property provision.

22. The computer program product of claim 21, further comprising:

computer readable code providing output from the software configuration management system in response to a request for retrieval of the artifact from the software configuration management repository, the output including the artifact and the associated intellectual property provision.

* * * * *